April 26, 1955

J. L. HILL 2,706,917

PORTABLE COUNTERSINKING TOOL

Filed Dec. 4, 1950

JAMES L. HILL
Inventor

Hubert Miller
Attorney

April 26, 1955 J. L. HILL 2,706,917
PORTABLE COUNTERSINKING TOOL
Filed Dec. 4, 1950 2 Sheets-Sheet 2

JAMES L. HILL
Inventor

By Hubert Miller
Attorney

United States Patent Office 2,706,917
Patented Apr. 26, 1955

2,706,917

PORTABLE COUNTERSINKING TOOL

James L. Hill, Wichita, Kans., assignor to Boeing Airplane Company, Wichita, Kans., a corporation of Delaware Application December 4, 1950, Serial No. 199,071

9 Claims. (Cl. 77—2)

This invention relates to power driven portable countersinking tools, and particularly to a tool of this type which is controlled and operated by means including fluid pressure means.

Present day power countersinking tools require the manual application of end thrust axially along the countersink bit against the work piece to accomplish the necessary cutting of the metal. In countersinking holes of relatively large diameter the end thrust required is large, and operator fatigue is high. Alternate operators must be used, or frequent operator rest periods allowed.

It is the chief object of this invention to provide a tool which is capable of attaching itself to the work piece, and of providing the necessary end thrust to accomplish the countersinking operation independent of the operator, and in the absence of auxiliary jigs, clamps, etc. attached to the work piece.

It is another object to provide a countersink tool of this type which is capable of high production output—one which will countersink a given number of holes of a specified size in approximately one-fifth the time required for doing the same job with a power tool which requires the operator to provide the necessary end thrust.

Another object is to provide a tool in which the rate of penetration of the bit into the work can be predetermined by the operator, thus making it possible for the tool to perform with high efficiency regardless of the material on which it is used, and regardless of the size of the holes being countersunk.

Still another object is to provide a tool having an expanding mandrel and a variable depth guide which cooperate to grip the work sheet between them and hold the tool in proper position for the countersinking operation, the depth guide also serving to hold the cutting bit at right angles to the surface of the work piece, and to limit its depth of cut.

Another object is to provide a countersink tool of this class which requires only a single operator, and a minimum of physical exertion on his part.

The invention, together with other objects attending its production and use, will be more clearly understood when the following description is read in connection with the accompanying drawings, in which:

Fig. 1 is a side elevation of a tool embodying the invention, certain parts being drawn in section and certain other parts being cut away for clarity, a draw bar constituting a part of the tool being shown at the outer end of its stroke;

Figs. 4 and 5 are vertical sectional views through an expanding mandrel which forms a part of the tool, the views being taken at 45° from each other.

*General description*

Figures 2, 3:
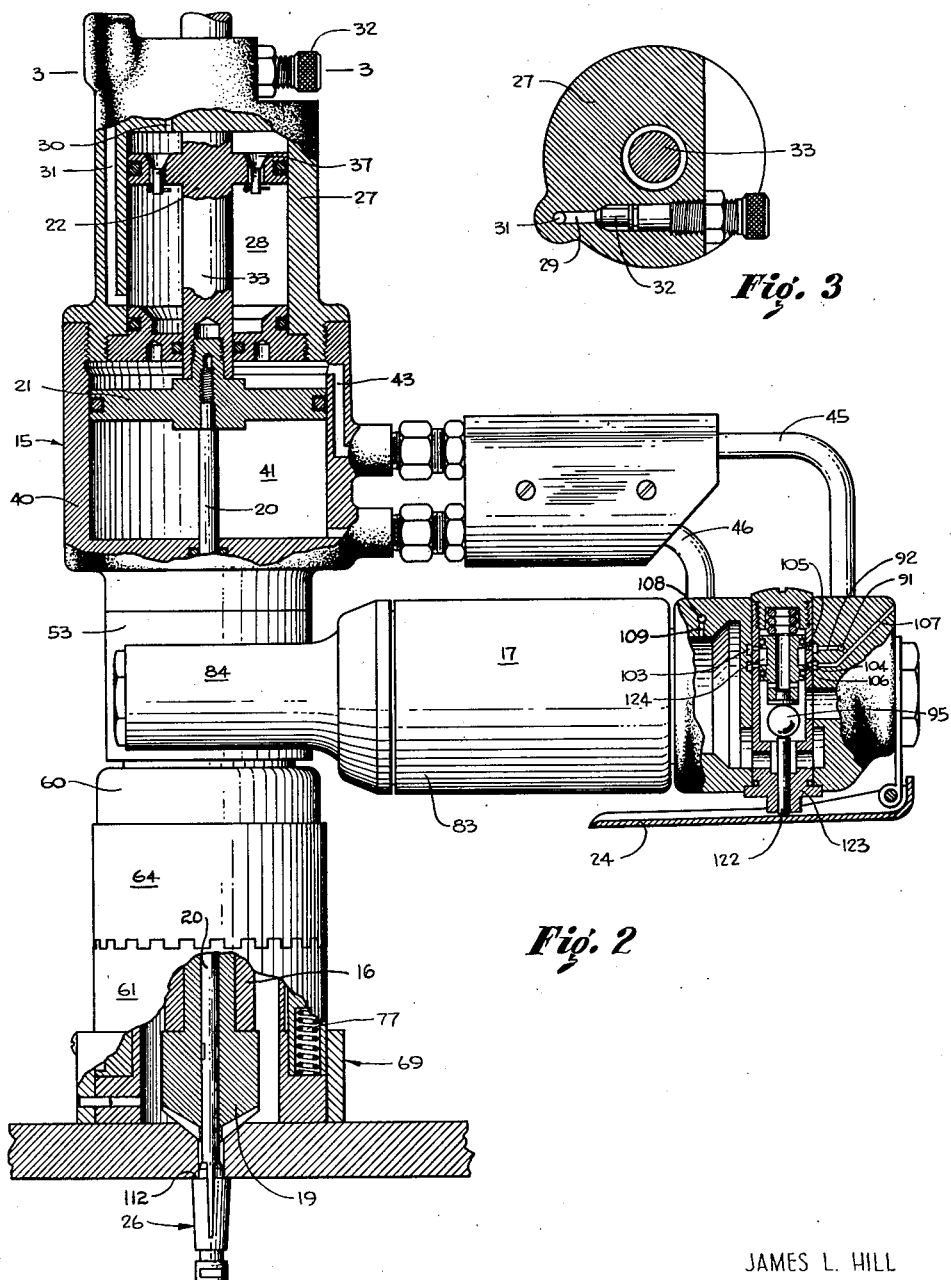
Fig. 2 is a view similar to Fig. 1, the draw bar shown at the inner end of its stroke holding the entire tool in countersinking position on a work piece.
Fig. 3 is a horizontal sectional view taken along the line 3—3 of Fig. 2.

Referring to Fig. 1, the tool illustrating the invention generally includes an elongated generally cylindrical housing designated as a whole by the numeral 15, a hollow drive shaft 16 journaled in the housing, a power unit 17 for rotating the drive shaft through a conventional worm gear drive 18, an axially bored countersink bit 19 mounted concentrically on the drive shaft at one end of the housing, a draw rod 20 mounted for reciprocating movement through the drive shaft and countersink bit and projecting outwardly from the latter, a fluid pressure operated piston 21 within a cylinder formed in the housing, the piston being operatively connected to the inner end of the draw rod for selectively reciprocating it, a dash pot including a valved piston 22 connected to the piston 21 for governing the rate at which the draw rod is moved into the housing by the piston 21, a control valve assembly 23 with operating handle 24 for simultaneously controlling operation of the power unit 17 and the application of fluid pressure to the opposite sides of piston 21 for reciprocating the draw rod, a spring pressed combination countersinking depth guide and work contacting member 25 mounted for selectively limited longitudinal movement on that end of the housing adjacent the bit 19, and an expanding mandrel 26 carried by the outer end of the draw rod for anchoring in a hole to be countersunk in a work piece and for drawing the member 25 into work piece contact and the bit 19 into countersinking contact with the work piece when the draw rod 20 is moved into the housing by the piston 21.

*Details of construtcion*

The housing 15 is preferably made in threadedly connected sections, as shown. A dash pot section 27 includes a cylinder 28 for the piston 22, and a fluid by-pass connecting opposite ends of the cylinder and made up of connecting ducts 29, 30, and 31. A conventional needle type valve 32 adjustably controls the rate of flow of fluid through this by-pass, and hence the rate at which the piston 22 is permitted to move upward in its cylinder. This piston 22 is carried substantially midway between the ends of a piston rod 33, the upper end of which reciprocates through a conventional packing gland (not shown) in the upper end of section 27. A stop nut 34 and a lock nut 35 are carried on the exterior end of the piston rod 33, and limit movement of this rod in a downward direction. The piston 22 is provided with an O-ring seal 36, and a plurality of upwardly opening check valves 37 which permit relatively free movement of the piston in a downward direction. The lower end of cylinder 28 is closed by a threaded insert 38, and sealed by an O-ring seal 39.

The operating piston section 40 of the housing 15 includes an internal cylinder 41 which is sealed off from the dash pot cylinder 28 by the insert 38, and by an O-ring seal 42 which seals around the lower portion of the piston rod 33. The extreme lower end of this rod 33 is provided with a threaded socket for receiving a complementally threaded central boss on the piston 21. Air ducts 43 and 44 afford communication between the respective opposite ends of the cylinder 41 and a source of fluid pressure through pipes 45 and 46 and couplings 47 and 48, as will be herein explained in detail. The lower end of the piston 21 is centrally bored and threaded to receive the upper threaded end of the draw rod 20. An O-ring 49 seals around this reciprocating draw rod.

The lower end of section 40 has a central cylindrical bore 50 into which an upper drive shaft bearing 51 fits. Intermediate its ends the drive shaft is journalled in a thrust type ball bearing 52 which seats tightly in the lower end of another section of the housing 15—the worm drive section 53. Intermediate the bearings 51 and 52 the drive shaft 16 carries the worm wheel 18 which is locked thereon by means of keys 55 and 56. The worm wheel 18 meshes in a conventional manner with a worm (not shown) carried on the adjacent end of the power unit drive shaft 57. A nut 58 locked on the upper threaded end of the drive shaft 16 cooperates with a drive shaft shoulder 59 to prevent end play of the drive shaft with relation to the bearings.

Two additional sections 60 and 61 complete the housing 15. The section 60 threadedly engages the lower end of section 53 and is provided with an internal shoulder 62 which engages the outer race of bearing 52 and locks that bearing against endwise movement. A circular wiper type seal 63 is carried internally by the section 60 and engages the surface of drive shaft 16 to prevent leakage of lubricant from the worm drive section 53.

The upper enlarged portion of section 60 is externally fitted with a sleeve 64 which is longitudinally slidable thereon. A pin 65 fixed internally near the upper end of sleeve 64, is slidable in a longitudinal slot 66 in the wall of section 60, and the two cooperate to prevent relative rotation of the sleeve. The lower end of sleeve 64 is regularly serrated as clearly shown in Fig. 2 and fits the complementally serrated upper end of section 61, this arrangement serving to lock section 61 in various desired positions of orientation with relation to section 60. A coil spring 67 surrounds the reduced lower end of section 60 inside the sleeve 64 and bears against an internal shoulder 68 to normally maintain the sleeve at the lower end of its permitted travel, with the previously mentioned serrations interlocked.

The upper internally threaded end of housing section 61 threads loosely onto the lower end of section 60. By manually sliding the sleeve 64 upward in Fig. 1 the section 61 is freed for rotation. It can thus be screwed upward or downward on section 60 to vary its longitudinal position with relation to the bit 19, the purpose of which will be herein described. It is locked in any desired position by releasing the sleeve to the action of spring 67, thus permitting the serrations to interlock.

The lower end of section 61 slidably carries a spring pressed work contacting member designated as a unit by the numeral 69. It includes an inner sleeve 70 the upper end of which slidably engages the inner cylindrical wall surface of section 61, the two wall engaging portions thus serving to guide the member 69 during its limited longitudinal travel with respect to the remainder of the housing. Near its lower end the sleeve 70 is provided with an annular right angled shoulder 71. A relatively wide heavy metal collar 72 slidably encircles the cylinder lower end of section 61, and is rigidly but removably secured externally to the enlarged cylindrical lower end of sleeve 70 by means of a plurality of press fitted pins 73, as shown. A plurality of movement limiting or stop pins 74 are carried by the upper end of this collar and project inwardly into longitudinal slots 75 in the outer wall of section 61. At intervals between the stop pins 74 spring recesses 76 are drilled longitudinally into the lower end of section 61. Coil springs 77 are housed in these recesses and bear against shoulder 71 to normally maintain the member 69 at the outer end of its permitted travel.

As will be seen from Fig. 1, one end of the drive shaft 16 is enlarged in diameter and bored to receive the shank of the countersink bit 19. To prevent the bit from rotating or moving longitudinally within the drive shaft socket, both the socket and bit shank are drilled laterally so that half the drilled hole lies in the adjacent surface of each of them. A tight fitting pin 78 is forced into this lateral hole and locks the bit shank in the drive shaft socket.

An additional means of preventing longitudinal movement of the bit in its socket includes an annular groove 79 cut into the surface of the bit shank, and an annular snap ring groove 80 cut into the exterior surface of the drive shaft, the two grooves being located in the same plane when the bit shank is seated in its socket. A hole drilled diametrically through one wall of the drive shaft socket in the same plane as the two grooves 79 and 80 is adapted to receive a blunt nosed insert 81 the inner end of which projects complementally into the groove 79. The outer end of this insert 81 is slotted as at 82 to form a continuation of the groove 80. A conventional snap ring (not shown) can be seated in the groove 80 and in the slot 82 and serves to hold insert 81 firmly seated in the groove 79.

*Fluid pressure control*

The power unit 17, illustrated, is an air driven motor. Its casing 83 and the worm drive casing 84 (Fig. 2) are separable, the latter being cast integral with section 53 of the housing 15. At its outer end the power unit is provided with a fitting 85 which is adapted to be connected to a source of high pressure air. This fitting also serves to mount a control lever hinge bracket 86 on the outer end of the control valve housing 87. The inner end of fitting 85 is provided with a fine mesh air screen 88, and the bore of the fitting communicates with a longitudinal air duct 89. The casing 87 is provided with a lateral bore which communicates with duct 89 and with a duct 90, which in turn delivers air to the power unit casing 83. Air delivery pipe 45 communicates with this lateral bore through a lateral duct 91 and a communicating longitudinal duct 92. The mentioned lateral bore serves as a housing for control valve assembly 23.

The control valve shown is a combination piston and ball type, but other types could be used as substitutes. The valve includes a liner type cylinder 93 which is press fitted into and is somewhat shorter than the mentioned lateral bore. At its inner end cylinder 93 is provided with a ball valve seat 94, which is normally closed by ball valve 95, housed within the cylinder.

A floating hollow piston 96 is closed at one end by a press fitted cap 97, which bears against ball 95 to normally keep it seated on its valve seat. The piston is urged in the direction of the ball valve by a spring 98 which bears against a cap 99 threaded into the end of cylinder 93. The piston 96 externally carries a pair of spaced O-ring seals 100, and is provided with a lateral bore 101 at a point adjacent the cap 97. A hole 102 in the side wall of cylinder 93 is aligned with duct 89. Annular grooves 103—104, cut into the wall of housing 87 surround cylinder 93, and respectively communicate with two longitudinally spaced series 105—106 of circumferentially spaced holes in the wall of cylinder 93. A vent duct 107 affords communication between the groove 104 and the atmosphere. A lateral duct 108 communicates at its outer end with air delivery pipe 46 and at its inner end with a radial duct 109 which is drilled into the wall of housing 87, and communicates with the interior of casing 83.

The construction of mandrel 26 should be understood in order to clearly understand the operation of the complete tool. The mandrel includes an expanding sleeve 110, an internal expander 111 for expanding the sleeve, and the draw bar 20. The sleeve is in the form of an elongated generally cylindrical shell one end of which is reduced slightly in diameter to form an annular shoulder 112. The end adjacent this shoulder has a central bore which is reduced slightly in diameter to snugly but slidably fit the draw bar 20, and its exterior is frusto-conical in shape. The sleeve wall is split longitudinally from the frusto-conical end at several circumferentially spaced points, the splits or saw cuts being indicated by the numerals 113—114. The continuous skirt 115 at the opposite end of the sleeve is of an internal diameter to fit slidably on the intermediate cylindrical portion 116 of the expander. The external diameter of the sleeve is the same as the external diameter of the enlarged end 117 of the expander. The expander has a portion 118 of reduced diameter, and its extreme adjacent end is conical in form as indicated at 119 to slidably engage the substantially complemental internal conical surface 120 of the sleeve. With the free end of the draw bar 20 secured in the threaded bore 121 of expander 111, a forced penetration of the expander into the sleeve will cause the split sections of the sleeve to move outward radially, resulting in an increase in the diameter of shoulder 112. It should be understood that different diameter mandrels will be used for different diameter holes to be countersunk. Preferably the external diameter of the sleeve in collapsed condition, as in Figs. 1, 4, and 5, should be just slightly less than the diameter of the hole in the work piece.

*Operation*

With the fitting 85 connected to a source of high pressure air, and the various valve parts in the normal or inoperative positions as shown in Fig. 1, pressure air cannot reach the air motor 17. Hence the motor is also inoperative. Pressure air can, however, pass through port 101, through the central bore of piston 96, through ports 105, annular groove 103, ducts 92 and 91, air delivery pipe 45 and into the upper part of cylinder 41 through duct 43. This pressure maintains the pistons 21 and 22 as well as the draw bar 20 at the lower ends of their permitted strokes, as shown in Fig. 1. It will be understood that the cylinder 28 is completely filled with liquid as a travel rate controlling medium. As the pistons 21 and 22 move to the positions shown, liquid beneath piston 22 passes freely through check valves 27 and the liquid thus offers little resistance to the travel of this piston. Simultaneously air beneath piston 21 passes through air pipe 46 and into the motor casing 83.

When the operator has inserted the mandrel 26 through the work piece hole to be countersunk, as in Fig. 2, he allows the shoulder 112 to move to an eccentric position with relation to the hole. This permits at least a portion of the shoulder to overlap a portion of the work piece surface adjacent the hole, and prevents initial withdrawal of the mandrel when draw bar tension is applied to the expander. Control lever 24 is next depressed and valve parts are moved to the positions shown in Fig. 2. This movement occurs as a result of the axial movement of a pin 122 within a packing gland 123, which seals one end of the valve assembly housing.

With ball valve 95 raised off its seat pressure air is free to flow through the lower part of cylinder 93 and directly to the air motor 17. The motor drive shaft 57 rotates countersink drive shaft 16 and the bit 19 through the worm gearing, thus giving a no-load start. As soon as the interior of casing 83 becomes pressurized, air is forced through ducts 108—109, through pipe 46 and into the space below piston 21. This piston, in moving toward the upper end of its cylinder, exerts a pull on draw bar 20. The entire housing 15 is thus pulled toward the work piece surface, movement of the mandrel being resisted by the overlapped portion of shoulder 112.

When the circular lower end of member 69 contacts the work piece surface the springs 77 are slowly compressed by the telescoping movement of member 69 on section 61. Further movement causes expander 111 to expand the free end of sleeve 110 and the shoulder 112 so that the mandrel assumes a position concentric to the hole being countersunk, and is positively locked therein, as shown in Fig. 2. Shortly thereafter, as a result of the continued relative movement of housing 15 and draw rod 20, the cutting end of bit 19 contacts the workpiece and begins to countersink the hole. Penetration of the bit into the workpiece is stopped when the shoulder 71 (Fig. 1) contacts the adjacent end of housing section 61, full contact being shown in Fig. 2.

As piston 21 moves upward (in Fig. 1), air above the piston is expelled through duct 43, pipe 45, ducts 91—92, annular groove 103, ports 105, annular space 124 (Fig. 2), and out through ports 106, groove 104, and port 107 to atmosphere.

As piston 22 is moved upward in its cylinder, check valves 37 are forced to close, and liquid above the piston is forced through duct 30 past needle valve 32, through ducts 29 and 31 to the opposite end of the cylinder. The speed at which liquid may pass needle valve 32 thus determines the speed at which piston 22 may move upward in its cylinder. This in turn governs the rate at which draw rod 20 travels axially, and consequently the rate at which bit 19 penetrates into the workpiece material. This rate may of course be changed simply by changing the needle valve setting in the desired direction.

When the bit 19 stops its penetration into the work piece, the operator releases his pressure on lever 24, the valve parts return to their Fig. 1 positions, and air pressure returns the draw rod 20, and the pistons 21—22 to their starting positions.

It should be noted that the mandrel 26, the draw rod 20, the bit 19, and the work contacting member 69 all have a common central longitudinal axis, and that the work contacting end of member 69 lies in a plane which is perpendicular to that axis. The member 69, then, not only serves to hold the work piece with relation to the housing, but also serves to force the bit axis into a position exactly perpendicular to the adjacent work piece surface. This assures that the hole is countersunk concentrically.

Having described the invention with sufficient clarity to enable those familiar with this art to construct and use it, I claim:

1. In a pneumatically operated portable tool, the combination with a casing, an axially bored countersinking tool rotatably supported therein against longitudinal movement with relation thereto, and a motor operably connected to rotate said tool, of a cylinder arranged longitudinally in the casing, a piston in the cylinder, a draw bar having one end connected to said piston and its other end projecting through the axial bore of said tool and extending outward beyond the casing and beyond the cutting end of said tool; an expanding anchor spaced from the bit and fixed on the extreme outer end of said draw bar, said anchor being capable of passing bodily and entirely through a hole in a work piece and expanding to anchor against the opposite surface of the work piece in response to movement of the draw bar in a withdrawal direction; an axially bored work holder concentrically encompassing the tool and draw bar and mounted for limited telescopic movement on that end of the casing adjacent said anchor; and means connecting said cylinder to a source of pneumatic pressure to cause movement of the draw bar and its anchor toward said work holder, whereby the work holder and anchor together grip a work piece between them while the tool performs the countersinking operation.

2. The invention described in claim 1 and a liquid filled dash pot in said casing operably connected with the draw rod for governing its rate of travel in a casing penetrating direction.

3. In a power operated countersinking tool, the combination with a casing or housing, an axially bored countersinking bit rotatably supported therein against longitudinal movement with relation thereto, and a motor connected to rotate said bit, of: an axially bored work contacting and gripping holder encompassing the bit and projecting outward beyond the cutting end thereof, said holder being mounted for limited telescopic movement on the casing; a drawbar reciprocably mounted in the casing and projecting outward through the bore of said bit and beyond the outer end of said holder; a work gripping and holding anchor fixed on the outer end of said draw bar adapted to pass bodily and entirely through a hole in a work piece and to exert a work clamping pressure on the far surface of the work piece in response to movement of the draw bar in a housing penetrating direction, said holder adapted to exert a work gripping force on the opposite surface of the work piece in response to the same movement of the draw bar; and a working cylinder within the casing connected to the draw bar for moving it in a housing penetrating direction.

4. A countersink tool comprising: an elongated housing; an axially bored countersink bit mounted at one end of the housing for rotational movement only; a fluid pressure operated motor mounted on the housing and operably connected with said bit for rotating it; a draw rod reciprocably mounted in the housing and projecting outwardly therefrom through the bore of said bit; a fluid pressure operated working cylinder in said housing having its plunger operably connected to said draw rod for forcibly moving the draw rod axially; means for controlling the fluid pressure operation of said motor and said working cylinder; an axially bored work holder mounted for limited telescopic movement on that end of the housing adjacent said bit for exerting a clamping force against one surface of a work piece when the housing and bit are moved toward the work piece; and a work piece gripping anchor mounted on the outer end of said draw rod, said anchor being of a size and shape to pass bodily and entirely through a hole to be countersunk, and adapted to exert a gripping force against the opposite surface of a work piece to prevent its withdrawal through said hole when the draw rod moves in a housing penetrating direction.

5. A power countersinking machine comprising: an elongated housing; first and second adjacent longitudinally aligned cylinders in said housing; aligned first and second pistons housed respectively in said cylinders, the opposite ends of said first cylinder being adapted for connection to a source of fluid pressure; liquid surrounding the piston and filling the second cylinder; a piston rod rigidly connecting the two pistons together in tandem; a controllable liquid by-pass affording flow around the second piston in one direction; a check valve in said second piston affording free movement of said piston in the other direction; a draw bar reciprocably mounted in said housing and having one end operably connected to said first piston; a hollow drive shaft journaled in said housing and surrounding said draw bar; a hollow countersink bit surrounding said draw bar and operably connected to said drive shaft; a fluid pressure operated motor mounted on the housing operably connected to said drive shaft; an axially bored work holder mounted for limited telescopic movement on that end of the housing adjacent said bit for exerting a clamping force against one surface of a work piece when the housing and bit are moved toward the work piece; and a work piece gripping anchor mounted on the outer end of said draw rod, said anchor being of a size and shape to pass bodily and entirely through a hole to be countersunk, and adapted to exert a gripping force against the opposite surface of a work piece to prevent its withdrawal through said hole when the draw rod moves in a housing penetrating direction.

6. A countersink tool comprising: a housing; an axially bored countersink bit rotatably mounted near one end of the housing, there being no permitted axial movement of the bit with relation to the housing; a power unit for rotating said bit; a draw rod in the housing projecting outward through said bit and reciprocable with relation to both; an expandible mandrel fixed on the outer end of the draw rod, said mandrel being of a size and shape to pass bodily and entirely through the hole to be countersunk; means on the mandrel to anchor against the margin of the hole in the work piece in response to slight movement of the draw rod in a withdrawing direction after the entire mandrel has first passed bodily through the hole; a workpiece contacting member mounted on the housing and projecting outward from the said one end thereof toward the mandrel, said member having limited reciprocable movement with relation to the draw rod and housing in a direction substantially parallel to the draw rod axis; spring means urging the work contacting member outward from the housing; and fluid pressure operated means operably connected to the draw rod and housing to effect relative movement of the bit and work piece contacting member toward the mandrel, the workpiece thus being gripped between the mandrel and the cooperating workpiece contacting member during the countersinking operation.

7. The tool described in claim 6 and a liquid filled dash pot operably connected to the draw rod to limit its speed of movement.

8. The tool described in claim 6 and means for controlling the power unit and said fluid pressure operated means.

9. The invention described in claim 6 in which said work piece contacting member is sleeve like in form and encircles said bit and draw bar.

References Cited in the file of this patent

UNITED STATES PATENTS

| 1,964,023 | Armstrong | June 26, 1934 |
| 2,301,151 | Spievak | Nov. 3, 1942 |
| 2,395,018 | Sherman | Feb. 19, 1946 |
| 2,466,745 | Seamans | Apr. 12, 1949 |
| 2,488,992 | Taylor | Nov. 22, 1949 |
| 2,527,968 | Sherman et al. | Oct. 31, 1950 |